United States Patent
Chi et al.

(10) Patent No.: US 9,477,496 B2
(45) Date of Patent: Oct. 25, 2016

(54) METHOD AND APPARATUS FOR LOADING CLASSES AND RE-ORGANIZING CLASS ARCHIVES

(75) Inventors: Chang Yan Chi, Beijing (CN); Xin Hui Li, Beijing (CN); Wen Peng Xiao, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1820 days.

(21) Appl. No.: 12/393,302

(22) Filed: Feb. 26, 2009

(65) Prior Publication Data

US 2009/0217022 A1 Aug. 27, 2009

(30) Foreign Application Priority Data

Feb. 27, 2008 (CN) .......................... 2008 1 0082608

(51) Int. Cl.
*G06F 9/24* (2006.01)
*G06F 9/445* (2006.01)

(52) U.S. Cl.
CPC ................................ *G06F 9/44521* (2013.01)

(58) Field of Classification Search
CPC ............................. G06F 9/445; G06F 9/44521
USPC ......................................................... 717/166
See application file for complete search history.

(56) References Cited

U.S. PATENT DOCUMENTS

| 5,923,878 | A * | 7/1999 | Marsland | ............ | G06F 9/44521 |
| | | | | | 717/139 |
| 6,339,841 | B1 * | 1/2002 | Merrick | ............ | G06F 9/44521 |
| | | | | | 707/999.103 |
| 7,020,874 | B2 | 3/2006 | Sokolov | | |
| 2003/0058277 | A1 * | 3/2003 | Bowman-Amuah | ............ | G06F 17/30607 |
| | | | | | 715/765 |
| 2004/0255294 | A1 * | 12/2004 | Spotwood | ............... | G06F 9/445 |
| | | | | | 717/176 |
| 2004/0261069 | A1 * | 12/2004 | Verbeke | ............. | G06F 9/44521 |
| | | | | | 717/166 |
| 2006/0059474 | A1 * | 3/2006 | Bhansali | ............. | G06F 12/0276 |
| | | | | | 717/151 |
| 2007/0061795 | A1 | 3/2007 | Atsatt | | |
| 2007/0198974 | A1 | 8/2007 | Branda | | |
| 2008/0115117 | A1 * | 5/2008 | Wilkinson | ............. | G06F 8/443 |
| | | | | | 717/139 |

FOREIGN PATENT DOCUMENTS

CN 1591334 3/2005

OTHER PUBLICATIONS

Chandra Krintz, Abstract of "Reducing Load Delay to Improve Performance of Internet-Computing Programs", dissertation, 2001, University of California—San Diego, La Jolla, CA.
Chandra Krintz, David Grove, Vivek Sarkar, Brad Calder, "Reducing the Overhead of Dynamic Compilation", journal, 2001, 31:717-738, John Wiley & Sons, Ltd.

* cited by examiner

*Primary Examiner* — Wei Zhen
*Assistant Examiner* — Mohammed Huda
(74) *Attorney, Agent, or Firm* — Cantor Colburn LLP; David Quinn

(57) ABSTRACT

A method and apparatus for loading classes to virtual machines and a method and apparatus for reorganizing class archives. The method for loading a class to a virtual machine includes organizing a class archive before class loading such that the organized class archive includes a class contraction portion and loading only the class contraction portion of the class archive to the virtual machine at the moment of class loading. By first loading the class contraction portion from the organized class archive to the virtual machine at the moment of loading, the present invention curtails code redundancy, shortens loading time and reduces occupied memory resources.

15 Claims, 6 Drawing Sheets

| Type | Name | Count | |
|---|---|---|---|
| U4 | Magic | 1 | 201 |
| U2 | minor_version | 1 | 202 |
| U2 | major_version | 1 | 203 |
| U2 | constant_pool_count | 1 | 204 |
| cp_info | constant_pool | constant_pool_count-1 | 205 |
| U2 | access_flags | 1 | 206 |
| U2 | this_class | 1 | 207 |
| U2 | super_class | 1 | 208 |
| U2 | interfaces_count | 1 | 209 |
| U2 | Interfaces | interfaces_count | 210 |
| U2 | fields_count | 1 | 211 |
| field_info | Fields | fields_count | 212 |
| U2 | methods_count | 1 | 212 |
| method_info | Methods | methods_count | 214 |
| U2 | attributes_count | 1 | 215 |
| attribute_info | attributes | attributes_count | 216 |

Fig.2

METHOD AND APPARATUS FOR LOADING CLASSES AND RE-ORGANIZING CLASS ARCHIVES

CROSS REFERENCE TO RELATED APPLICATION

This application claims priority under 35 U.S.C. §119 from Chinese Patent Application No. 200810082608.8 filed Feb. 27, 2008, the entire contents of which are incorporated by reference herein.

BACKGROUND OF THE INVENTION

1. Field of the Invention

The present invention relates to virtual machine technology. More particularly, the present invention relates to a method and apparatus for loading classes into virtual machines and a method and apparatus for re-organizing class archives.

2. Description of the Related Art

Java™ is a cross-platform tool, which has good portability and is platform independent. Hence, Java™ has been put into extensive use in various fields. The virtual machine is an engine for Java™ applications for interpreting compiled applications, which plays a crucial role in platform-independent characteristics. Applications written in the Java™ language are not compiled into standard executable codes but into bytecodes, that is, a binary format suitable for execution by virtual machines, and packed and saved in class archives (for example, jar files). During execution of applications, a class loader loads Java™ application bytecodes, in a class file format, from class archives into a virtual machine that is running on or embedded into application platforms. The class file is of a binary file format defined for Java™ programs and can be interpreted by any virtual machine. Each class file represents a complete description of a Java™ class or interface, which is a special abstract class. As long as there is a suitable virtual machine on an application platform, Java™ applications can be loaded to the virtual machine and then run on the application platform.

During the procedure of class loading in the prior art, the task of class loading is first delegated to a default root class loader. The root class loader can assign concrete tasks to respective child class loaders that search for class archives along the class path until they find the class archives. Then, the found class archives are unpacked, and each of the file names in an archive is matched with the desired class name one by one until the completely matched class file is found. Afterwards, entries are searched for and bytecodes of the class are extracted and loaded to the virtual machine.

However, there are several problems during the procedure of class loading in the prior art.

A first problem is code redundancy. During the procedure of class loading in the prior art, classes are loaded to virtual machines in the class file unit and an internal data structure is created for each loaded class. Additionally, all binary data in the class file are transferred to the method area within a memory without any extraction and contraction. However, in many cases, the whole class that is loaded to the virtual machines or some portions thereof is seldom or never used after loading. This is because those applications are usually developed for ordinary users and that only a small portion of applications are used for a specific case. Hence, for the specific case, this will lead to a pretty inefficient usage of memory space. As used herein, "case" means the set of a series of activities, where a specific user uses applications in a given software and hardware environment.

To obtain knowledge of the current code redundancy situation, a standard application was tested using a Java™ performance analyzer (Profiler), Java™ heap analysis tool (JHat) and an available syntactic analysis, and lexical analysis tool (Antlr). This standard application includes a number of functions; the main functions were tested. In order to obtain relatively stable results, times of tests have been implemented, and averages values of times of tests are used as test results. According to the results, methods that are used for startup share about 32.8% of all the loaded methods, bytecodes that are used for startup account for about 0.13% of all the loaded bytecodes, methods that are used for plug-in development account for about 87.2% of all the loaded methods, and bytecodes that are used for plug-in development account for about 1.3% of all the loaded bytecodes. This experiment shows that there is serious code redundancy in current class loading methods. In particular, such code redundancy will exert a more adverse effect on program performance in an environment that has limited memory resources, such as a mobile device.

Another problem in the procedure of class loading in the prior art is that class loading time is too long. This is because, on the one hand, all class files are loaded to a virtual machine regardless of whether they are likely to be used or are not used during later running. On the other hand, it takes a large amount of time to search for the proper class during the procedure of class file loading. The too long class loading time significantly affects program performance.

U.S. Pat. No. 7,020,874 B2, which was issued on Mar. 28, 2006, discloses a technique for loading class files to virtual machines. This technique loads class files to a memory portion of a computer system, selectively loads class files from the memory portion to a virtual machine, recognizes and extracts desired parts of desired classes from the memory portion when a desired class file is not in the virtual machine, and loads them to the virtual machine. The technique disclosed in this patent reduces code redundancy to a certain extent and shortens class loading time. However, this method needs a dedicated memory for loading class files, thereby occupying precious system resources and thus producing low memory utilization efficiency. In particular, program performance might be affected greatly in an environment that has limited memory resources, such as a mobile device.

Therefore, there is a need in the technical field of class loading to improve current class loading manners in order to provide more proper class loading techniques.

SUMMARY OF THE INVENTION

The present invention provides an improved class loading method that can decrease code redundancy, shorten loading time and reduce occupied memory resources.

According to an aspect of the present invention, a method for loading a class to a virtual machine is provided, including the steps of organizing a class archive before class loading so that the organized class archive includes a class contraction portion, and loading only the class contraction portion of the class archive to the virtual machine at the moment of class loading. The method of the present invention first loads the class contraction portion from the organized class archive to the virtual machine during class loading, thereby reducing code redundancy and loading time and improving utilization efficiency of a memory.

According to another aspect of the present invention, an apparatus for loading a class to a virtual machine is provided. The apparatus includes:

a class loader; and a class archive having a class contraction portion; wherein said class archive is organized before class loading such that the organized class archive includes the class contraction portion of said class archive; and wherein said class loader is configured to load only said class contraction portion of said class archive to the virtual machine. According to a further aspect of the present invention, a method for reorganizing a class archive is provided, including organizing the class archive such that the organized class archive includes only the class contraction portion of the class archive being loaded at the moment of loading.

According to a still further aspect of the present invention, an apparatus for loading a class to a virtual machine is provided, including a class loader, wherein a class archive is organized before class loading, such that the organized class archive includes a class contraction portion, and the class loader is configured to load only the class contraction portion of the class archive to the virtual machine at the moment of class loading.

With the present invention, code redundancy and loading time are reduced, and utilization efficiency of a memory improved.

BRIEF DESCRIPTION OF THE DRAWINGS

FIG. 2 is an example of the structure of a class file.

DETAILED DESCRIPTION OF THE PREFERRED EMBODIMENTS

Hereinafter, a detailed description will be given first to a method and apparatus for loading classes to virtual machines of the present invention with reference to the accompanying drawings by way of embodiments. It should be noted that because "interfaces" are a special abstract class, wherever the term "class" is used in the specification it is meant to include "interface".

Figure 3:
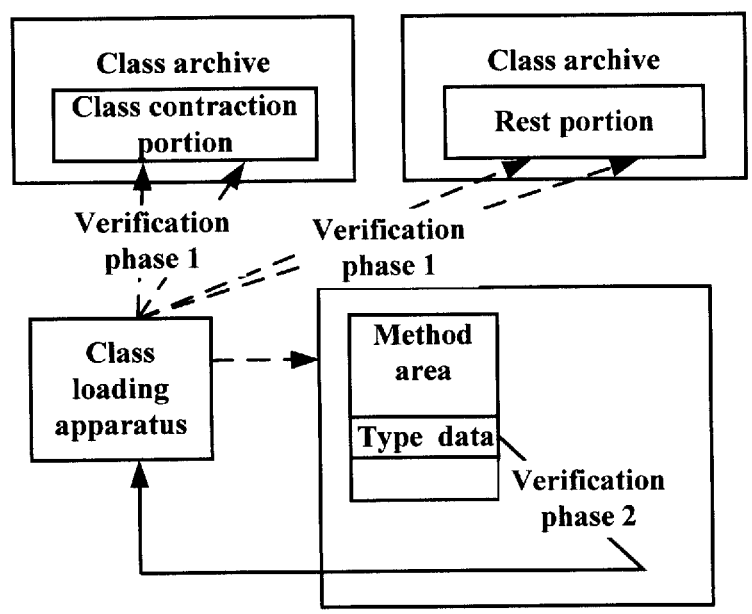
FIG. 3 is a block diagram of the procedure of security verification according to an embodiment of the present invention.

The method for loading classes to virtual machines of the present invention will be described in detail with reference to FIGS. 1 to 3 by way of embodiments.

Referring to FIG. 1, classes are first separated into a skeleton describing basic class information and contents describing detailed class information in step 101. By separating classes, it is intended to reduce the granularity of class loading of the present invention and make the unit of class loading much smaller.

To illustrate class separation, description is first given to the structure of a class file here. FIG. 2 depicts an example of the structure of a class file. The example shows the standard class file format defined in the Java™ virtual machine specification. The structure of a class file contains all information related to the class or interface and desired by virtual machines, and binary bytecodes are stored in an order specified in the structure of a class file.

The table shown in FIG. 2 includes items 201 to 216. Among them, parameter "magic" 201 is a magic code and a special word specifying the class file format, with a value of 0xCAFEBABE, indicating that this segment of codes is a class file. Items "major_version" 203 and "minor_version" 202 respectively represent the major version number and the minor version number of the class file format, indicating the format to which the class file conforms. Item "constant_pool_count" 204 indicates the count of constants in item "constant_pool" 205. Item "constant_pool" 205 is a cp_info structural table that contains information on respective elements in the constant pool. In addition to various constant values, "constant_pool" further contains symbol references to names of classes or interfaces, field names and descriptors defined in classes or interfaces, and descriptors and method names, which symbol references will be transformed into real addresses during execution of virtual machines. Item "access_flags" 206 are flag masks indicating whether the class file is a class or interface and indicating the access authority thereof. Parameter "this_class" 207 points to the "CONSTANT_Class_infor" structure in "constant_pool" 204. The "CONSTANT_Class infor" structure represents a class or interface defined by the class file. Item "super_class" 208 points to another similar element in "constant_pool" 204, representing a direct father class or father interface of the class file, and it represents that there is no father class when the value is zero. Parameter "interfaces_count" 209 represents the count of direct father interfaces of the class or interface. Item "interfaces" 210 contains the locations of these father interfaces in the constant_pool table.

Additionally, "fields" 212 is a Field_info structural list, which saves variables declared in the class or interface. "Fields_count" 211 is the length of the Field_info structural list. "Methods" 214 is a method_info structural list, which saves methods declared in the class or interface. "Methods_count" 213 is the length of the method_info structural list. "Attributes" 216 is an "attribute_info" list, which saves some indices pointing to constant_utf8_info in the constant pool. "Attributes_count" 215 is the length of the attribute_info structural list.

As is clear from the foregoing description, items 201 to 210 are some basic information of a class file, such as the magic code, major version number, minor version number, count of constants, constant pool, access flags that identify a class file. All of them are indispensable information to a class file. Items 211 to 216 describe concrete information defined in the class, such as respective variables, methods, attributes and count thereof.

Therefore, a class can be separated into two portions based on the structure of a class file, that is, a portion containing items 201 to 210 and a portion containing items 211 to 216. Among them, items 201 to 210 are a skeleton describing basic class information and items 211 to 216 serve as contents describing detailed class information. Correspondences between the skeleton and contents can be set up in order to associate the skeleton with contents because the class has been separated. Correspondences can be implemented via an index file. The index file may contain references to contents associated with the skeleton of each class, such as the address information on contents, so as to find the contents easily based on the skeleton. Alternatively, correspondences can be set up by referring to contents in a skeleton and acquiring references to their associated contents by means of searching in the loaded skeleton at runtime so as to learn address information of contents according to references. During the procedure of code loading, the loader of existing virtual machines can find needed codes by using existing dynamic linking techniques. Therefore, this manner does not need to modify the class loader of existing virtual machines.

It should be noted that, although the skeleton includes items 201 to 210 and contents only include items 211 to 216, items 212, 214 and 216 account for a considerable portion of the class file as they are information structural tables describing fields, methods and attributes respectively, which contain a large amount of element information.

Returning to FIG. 1A, in step 102, the skeleton in the class file is extracted and skeletons of all classes of a program are stored in one or more class archives as a class contraction portion and the rest, that is, classes' contents, is stored in another one or more class archives.

Figure 1A:
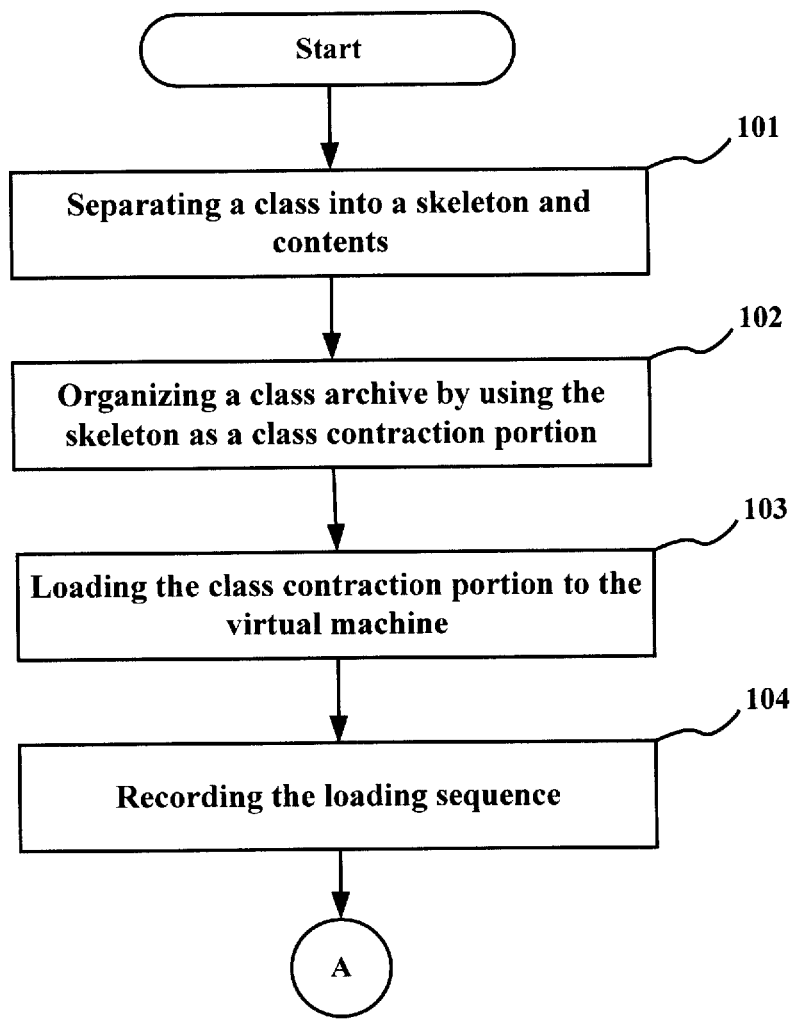
FIG. 1A is a flowchart of a method for loading classes to a virtual machine according to an embodiment of the present invention.

Although steps 101 and 102 are included in FIG. 1A, they are not essential. In an embodiment, class separation and class archive organization has been completed before execution of a program, so the class contraction portion is already available in loading classes. Therefore, steps 101 and 102 need not be included for class loading.

In another embodiment, before release of a program, developers or the provider have already re-organized class archives and thus obtained the class contraction portion that includes: the skeleton of a class to be used, describing basic class information, and contents to be used of the class, describing detailed class information. Such a contraction portion is obtained based on previous usage information of classes for example. Therefore, steps 101 and 102 may not be included in this embodiment.

Then, the method goes to step 103. In this step, the class contraction portion is loaded from the organized class archive to a virtual machine. At this point, the rest portion other than the class contraction portion is not yet loaded and the search for a class file is only implemented in one or more class archives including the class contraction portion. Therefore, it is seen that compared with manners of loading classes in the prior art, the method of the present invention loads the class contraction portion from organized class archives to virtual machines, instead of loading all class files to virtual machines or first loading the class files to a memory portion. Therefore, compared with the prior art, the apparatus for loading classes of the present invention significantly reduces code redundancy and class loading time and does not need an extra dedicated memory, thereby saving system resources.

In step 104, the sequence in which classes are loaded is recorded in order to provide useful information for class loading. The loaded classes and their loading sequence can be recorded by means of the performance analysis technique, such as JProfiling and binary code execution tracking technique, or by means of any other suitable technique in the prior art.

Figure 1B:
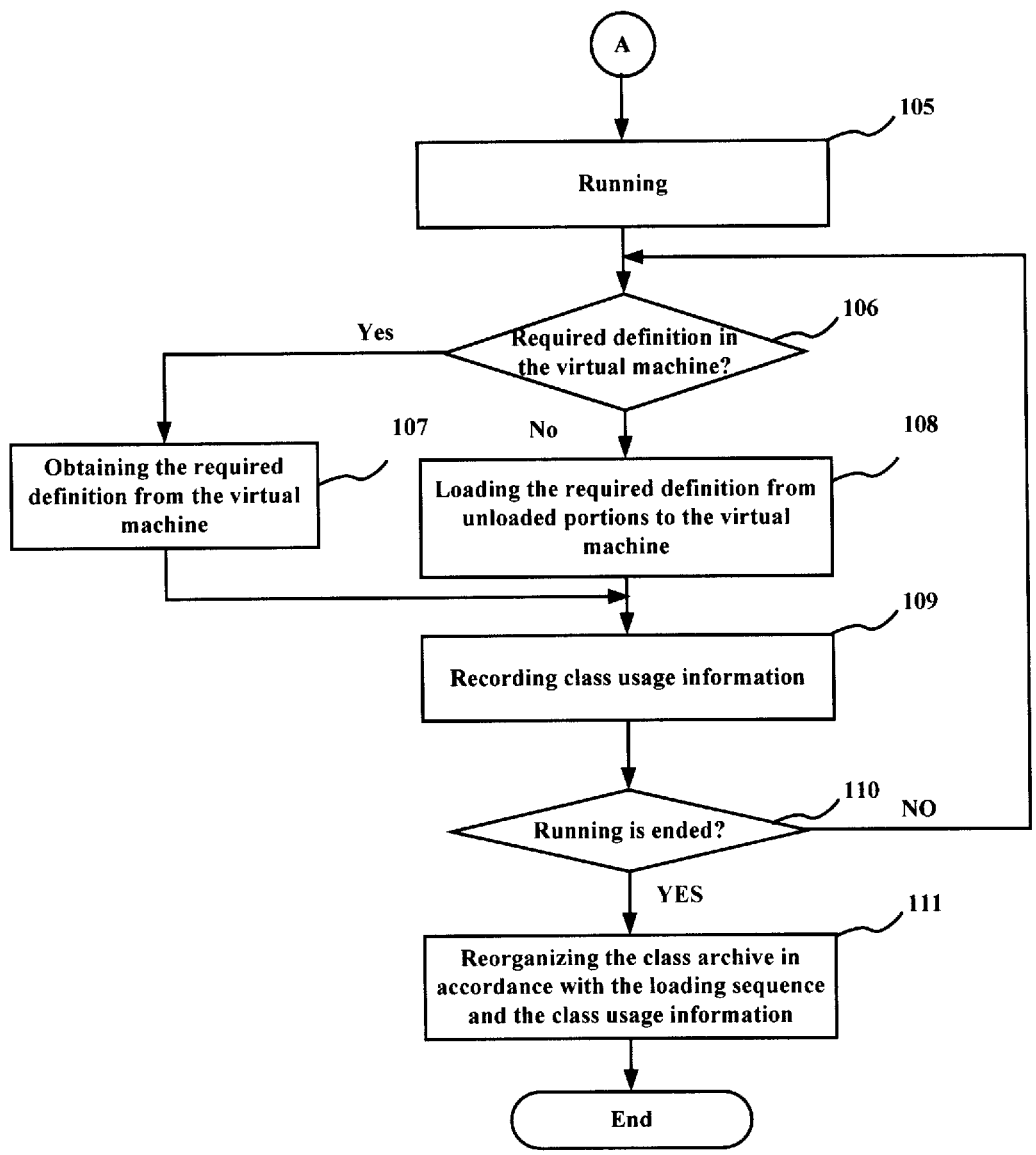
FIG. 1B is a flowchart of adjusting contents of a class contraction portion according to execution information at runtime after classes are loaded to a virtual machine according to an embodiment of the present invention.

Then, as shown in FIG. 1B, the method goes to step 105 to start the program's running process. Before definitions (the skeleton or contents of a class) are used at runtime, it is determined whether needed definitions are in the virtual machine or not in step 106. If yes, then needed definitions are acquired from the virtual machine in step 107. If no, then needed definitions are loaded from the unloaded portion (i.e. the rest portion other than the class contraction portion) in step 108. In this case, if definitions are the class' skeleton, then the class' skeleton is loaded from the unloaded portion. If needed definitions are the class' contents and the class' skeleton is in the virtual machine, then the constant pool of the virtual machine has been loaded with index information on the skeleton and contents. In this case, based on the index information such as contents' address, contents associated with the class' skeleton can be found so as to load the class' contents from the unloaded portion. If needed definitions are the class' contents whereas neither the class' skeleton nor contents are in the virtual machine, then searching is performed in class archives including the unloaded portion and the class' skeleton and needed contents are loaded to the virtual machine.

In step 109, class usage information is recorded. Class usage information may include the missed skeleton or contents and the skeleton or contents used at the runtime. Class usage information can be recorded using various analysis tools in the prior art. For example, loading of classes from the unloaded portion at the runtime can be analyzed using JHat in conjunction with Antrl. The active skeleton and contents at the runtime can be obtained using a Java™ profiler (Jprof). Afterwards, the miss rate of skeletons or contents and the non-usage rate of skeletons or contents can be obtained according to the recorded class usage information. For example, the miss rate of skeletons or contents can be obtained by making statistics on the number of times that the class' skeleton or contents are loaded from the unloaded portion at several times of program runtime and calculating the percentage of the loading times among program running times.

Likewise, the class' unused skeleton or contents in the class contraction portion at the runtime are obtained according to the class' used skeleton or contents at the runtime using code analysis tools. For example, the used skeleton and contents at the runtime are dynamically tracked and unused but loaded codes are obtained using these analysis tools. Then, statistics are made on the number of times that the class' skeleton or contents are not used in several program running periods and on the percentage of this number of times among the number of loading times or the number of program running times, so that the non-usage rate of the class' skeleton or contents is obtained.

In step 110, a decision is made whether running has ended or not. If not, then the program running procedure is continued. If the user demands to end running the program, then the method goes to step 111.

In step 111, class archives are re-organized using the loading sequence recorded during loading and the class usage information recorded at runtime, in order to add new skeletons or contents to the class contraction portion or delete therefrom those skeletons or contents that are usually not used, thereby optimizing the class contraction portion and facilitating class loading for subsequent program execution.

When the miss rate of skeletons or contents exceeds a predetermined threshold, the skeletons or contents can be added to the class contraction portion. When the non-usage rate of skeletons or contents exceeds another predetermined threshold, then the skeletons or contents can be deleted from the class contraction portion.

In addition, skeletons or contents can also be added using any other suitable policy. For example, in an embodiment, missing skeletons or contents are recorded in a first-in-first-out manner using a storage space with a fixed size. At the end of running, skeletons or contents left in the storage space are added to the class contraction portion. It should be noted that any other suitable manner can be used to add or delete skeletons or contents in order to optimize the class contraction portion.

Subsequently, the optimized class contraction portion is packed to one or more class archives, the rest portion is packed to another one or more class archives and reference information in the index file is updated at the same time. During later loading, a class contraction portion can be loaded from class archives including the optimized class contraction portion.

Besides, the class contraction portion can be sorted prior to the packing using the loading sequence recorded during loading, so that the sorting of said class contraction portion is consistent with said loading sequence. Because the path of the class contraction portion in the class file is consistent with the loading sequence, the time spent on searching for class information during loading can be reduced significantly and the loading time is decreased further.

In the embodiment shown in FIGS. 1A and 1B, class archives are re-organized before the program is ended. However, the class' loading information and class usage information can be stored in, for example, a non-volatile medium, and the reorganization of class archives can be performed based on the stored class loading information and class usage information at any suitable time.

As is clear from the foregoing description, class archives are reorganized every time based on the class usage information at the runtime and the class loading sequence, so that the class contraction portion is gradually optimized. Therefore, after a learning procedure, a stable class contraction portion can be obtained for a specific case. As a result, the fact that a required definition needs to be loaded seldom occurs, and the speed at which the program is running is accelerated little by little.

In another embodiment, class archives are divided into three portions while being reorganized in step 111, including one or more class archives of the class contraction portion, one or more class archives of used portions (which portions were once used but were not added to the class contraction portion), and one or more class archives of unused portions. According to this embodiment, when a required definition is not on the virtual machine, searching can be first implemented in class archives including used portions. If the required definition is not found, then searching is implemented in class archives including unused portions. Therefore, this method can further reduce the time spent on loading classes during the learning procedure and accelerate the speed at which the program is running.

As is further clear from the foregoing description, because the class contraction portion varies dynamically with the class usage situation at the runtime, the class loading method of the present invention has good adaptability and scalability.

The class loading method of the present invention has another prominent characteristic, that is, it still maintains the security architecture of the Java™ platform. Usually, the Java™ security verification is accomplished in two phases. Phase 1 is internal verification, including verification of bytecode integrity, class file format, internal consistency, class file length, how well-formed the individual components are, constraints specified by the Java™ programming language, and bytecodes, among which the verification of bytecodes is intended to verify a stream of bytecodes is safe for the virtual machine to execute (mainly intended for methods defined in the class or interface). Phase 2 includes verification of symbolic references, which is mainly to verify the existence of referenced fields or referenced methods in given classes, if referenced fields or methods have correct descriptors and if methods can access the referenced fields or referenced methods at runtime.

The prior art loads classes in the unit of a class file. Hence, phase 1 and phase 2 can be performed immediately after the class file is loaded. However, different from the prior art, the method of the present invention does not load classes in the unit of a class file. FIG. 3 schematically depicts a block diagram of the security verification procedure according to an embodiment of the present invention. Because only the class contraction portion is loaded at the moment of loading, the verification of symbolic references in phase 2 cannot be carried out during the initial loading. As shown in FIG. 3, the verification of phase 1 can be carried out during loading classes (including the loading of the class contraction portion and subsequent loading of missing skeletons or contents). The verification of symbolic references in phase 2 can be delayed to the execution of bytecodes. Specifically, during loading classes, internal verification except the verification of bytecodes can be carried out on the loaded skeleton, whereas the verification of bytecodes can be carried out on the loaded content. Additionally, where a class needs to be separated, a good opportunity for the execution of verification is after the separation of the class file but before class loading.

Figure 4:
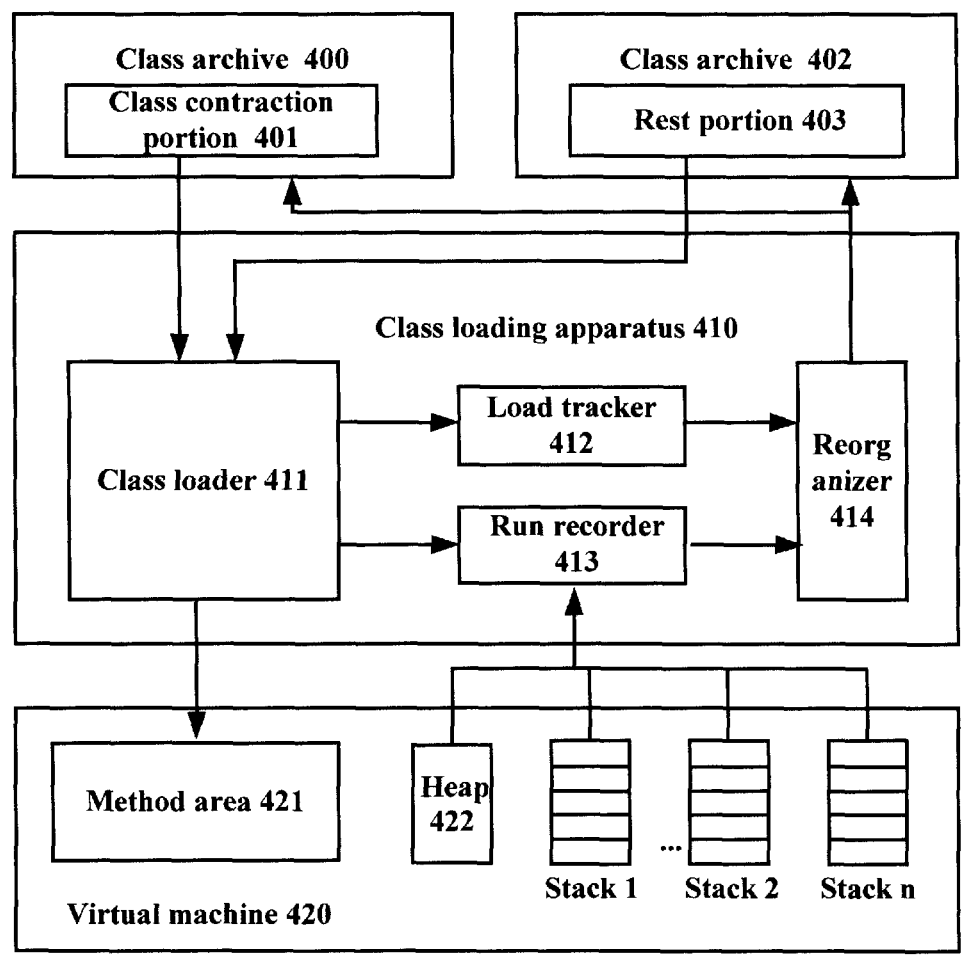
FIG. 4 is a block diagram of an apparatus for loading classes to a virtual machine according to an embodiment of the present invention.

FIG. 4 refers to the class loading apparatus of the present invention. FIG. 4 is a block diagram of the procedure of loading classes to a virtual machine according to an embodiment of the present invention.

As shown in this figure, a class archive 400 and a class archive 402 are class packed files that have been organized, i.e. jar files. Among them, class archive 400 includes a class contraction portion 401 and class archive 402 includes rest portion except the class contraction portion. Class contraction portion 401 is the set of part of information of class files.

In an embodiment of the present invention, a class file is separated into a skeleton, describing basic class information, and contents describing detailed class information. For example, when the archives are never organized, contraction portion 401 may only include classes' skeletons, and rest portion 403 include classes' contents. Class contraction portion 401 can be organized before the execution of a program or organized at the execution of a program but before class loading.

In another embodiment of the present invention, class contraction portion 401 may only include a skeleton of a class to be used, describing basic class information, and contents to be used of the class, describing detailed class information. Such a class contraction portion may be obtained based on class usage information, for example, and rest portion 403 may include others except class contraction portion 401.

A class loading apparatus 410 is an apparatus that loads classes to a virtual machine according to a preferred embodiment of the present invention, which apparatus includes a class loader 411. The apparatus may further include a load tracker 412, a run recorder 413 and a reorganizer 414.

Class loader 411 is configured to load class contraction portion 401 from organized class archive 400 to a virtual machine at the moment of loading. At the runtime, if a required definition is not on the virtual machine, class loader 411 can further load the required definition from rest portion 403 contained in class archive 402 to the virtual machine.

To further optimize the contraction class, class loading apparatus 410 can further adopt load tracker 412 and/or run recorder 413 to record some useful information. Load tracker 412 is configured to record the loading sequence of classes at the moment of loading so as to provide reorganizer 414 with information useful for loading. Run recorder 413 is configured to record class usage information at runtime so as to provide, through tracking contents saved in heaps and stacks, useful information at runtime used by the reorganized.

Reorganizer 414 is configured to reorganize class archives according to the class usage information recorded by run recorder 413 so that the class archives contain the class contraction portion to be loaded at subsequent loading. The class contraction portion may only include a skeleton of a class to be used, describing basic class information, and contents to be used of the class, describing detailed class information.

Reorganizer 414 can further be configured to sort the class contraction portion in accordance with the loading sequence provided by load tracker 412, so as to make the sorting of the class contraction portion consistent with the loading sequence. For a concrete policy and operation for organizing archives by the reorganizer, please refer to the foregoing description with respect to step 111.

Although the reorganizer is included within the class loading apparatus in this embodiment, the reorganizer can also be set outside class loading apparatus 410 and reorganize class archives using information provided by class loading apparatus 410.

A virtual machine 420 includes a method area 421, a heap 422 and stacks 1 to n. Method area 421 is used for saving information of a class file that is loaded to the virtual machine by the loader. Heap 422 is used for saving objects created when the program is running. When a thread is created, a Java™ stack will be allocated to this thread. The Java™ stack saves the state when a thread invokes a method, including local variables, parameters of an invoked method, returned values and intermediate variables of the processing.

As is clear from the foregoing description, different from class loaders in the prior art, class loader 411 loads the class contraction portion from organized class archives to the virtual machine, other than loading all class files to the virtual machine or first loading class files to the memory portion. Therefore, compared with the prior art, the class loading apparatus of the present invention significantly reduces code redundancy and class loading time and does not need an extra dedicated memory, thereby saving the memory space and improving the program performance.

Additionally, because run recorder 413 is able to record the class usage situation at runtime, reorganizer 414 can reorganize class archives according to the class usage situation at runtime so as to facilitate subsequent loading. In particular, a stable class contraction portion is formed for a specific case after a learning procedure. Afterwards, only the class contraction portion needs to be loaded and the fact that a required definition needs to be loaded seldom occurs. Therefore, the speed at which the program is running will be accelerated little by little.

Because load tracker 442 can record the loading sequence of classes at the moment of loading, the reorganizer can sort the class contraction portion in class archives to make the sorting consistent with the class loading sequence. Therefore, the path of the class contraction portion in class files is consistent with the loading sequence and the time spent on searching for class information at the moment of loading can be reduced greatly. Thus the loading time is further shortened.

The class loading apparatus of the present invention still maintains the security architecture of a Java™ platform. The class loading apparatus of the present invention can further include a security verifier that is responsible for carrying out the verification required by the security architecture of a Java™ platform. The security verifier can carry out internal verification during class loading and carry out the verification of symbolic references during executing bytecodes. Specifically, when loading classes, the security verifier can carry out interval verification except the verification of bytecodes on a loaded skeleton, whereas it can carry out the verification of bytecodes to loaded contents. Additionally, when a class needs to be separated, the security verifier can also start security verification after the completion of class separation.

A detailed description will be given below to a method and apparatus for reorganizing a class archive as provided by the present invention.

According to an embodiment of the present invention, a method for reorganizing a class archive includes reorganizing a class archive to make the class archive only contain a class contraction portion to be loaded at the moment of loading. The method can further include separating a class into a skeleton describing basic class information and contents describing detailed class information and making the class contraction portion contained in the class archive only include the class skeleton. In another embodiment, the reorganizing can be implemented according to class usage information at runtime to make the class contraction portion only include a skeleton of a class to be used, describing basic class information and contents to be used of the class, describing detailed class information. For the details of the reorganization method, please refer to the foregoing description of step 111 and other description related to the reorganization.

An apparatus for reorganizing a class archive as provided by the present invention will be described below.

Figure 5:
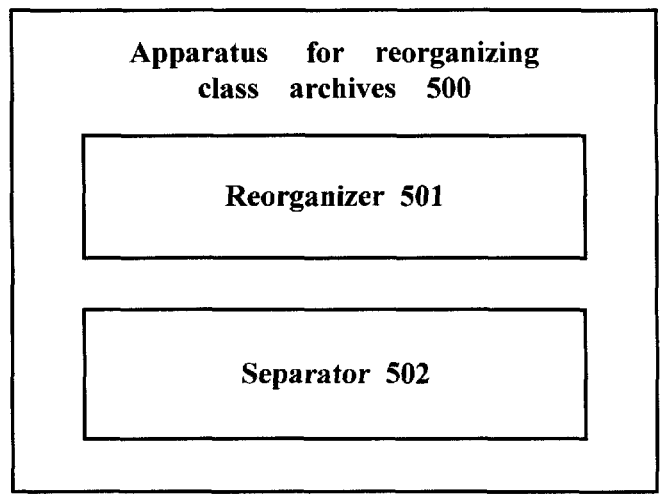
FIG. 5 is an apparatus for reorganizing a class archive according to an embodiment of the present invention.

FIG. 5 depicts an apparatus for reorganizing an archive according to an embodiment of the present invention. As shown in FIG. 5, an apparatus 500 for reorganizing class archives includes a reorganizer 501 configured to reorganize the class archive to make the class archive only include a class contraction portion to be loaded at the moment of loading. Apparatus 500 for reorganizing a class archive can further include a separator 502 configured to separate a class into a skeleton describing basic class information and contents describing detailed class information. Reorganizer 501 reorganizes the class archive to make the class contraction portion only include the class skeleton. For details of the operation of separator 502 and reorganizer 501 in this case, please refer to the foregoing description with respect to steps 101 and 102.

In another embodiment, the reorganizer can further be configured to reorganize the class archive according to class usage information at runtime and make the class contraction portion only include a skeleton of a class to be used, describing basic class information, and contents to be used of the class, describing detailed class information. For the description of the reorganization apparatus, please refer to the foregoing description of step 111 and reorganizer 414 and other description related to the reorganization.

Of course, the foregoing contents are illustrated in the context of an example of separation and organization methods. However, those skilled in the art will recognize that any way of reorganizing a class archive to form a class contraction portion or a similar structure should fall within the protection scope of the present invention. As a complement to separation, reorganizing an original class is an optional way of organization. Organizing the original class is meant to transform original class information in a class archive into a plurality of different class files. These newly generated class files include a skeleton class and a content class. The skeleton class will contain basic class information similar to the definition of skeleton in the separation method. The skeleton class can be adjusted to include more codes similar to the class contraction portion in the separation method. The skeleton class has the same name as that of the original class and is first loaded to the virtual machine at loading. The content class only includes detailed contents of the original class and has a different name with the original class. There may be only one content class that is formed by codes except the skeleton class. Alternatively, codes, except the skeleton class, can be divided to a plurality of different classes with the same dividing granularity as the loading granularity the use wants to control. Definitions of the skeleton class will include references to the content class, so as to find codes that are not contained in a current class via references after the skeleton class is loaded. The reorganization procedure will be completed before class loading and contents of the aforesaid class file can be adjusted according to running information of a case.

With the reorganization apparatus and method provided by the present invention, a class archive can be reorganized at any suitable moment so that flexibility of class archive reorganization is further provided.

Figure 6:
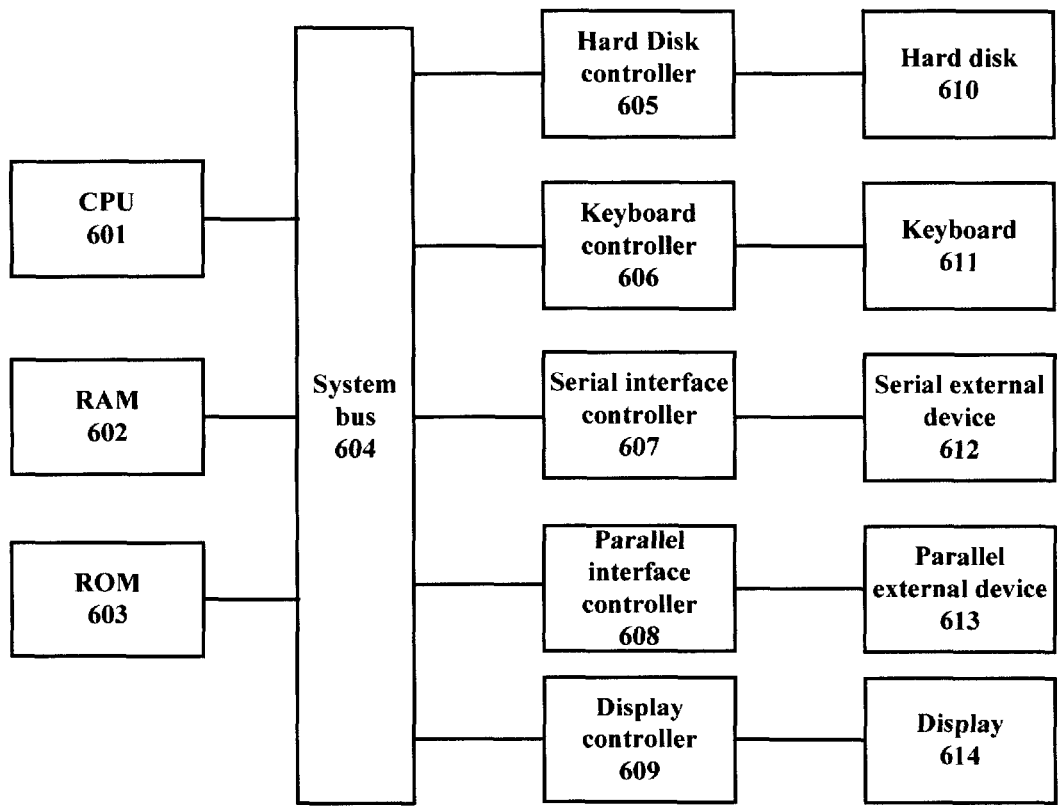
FIG. 6 is a structural block diagram of a computer device in which an embodiment according to the present invention may be implemented.

FIG. 6 schematically depicts a structural block diagram of a computer system in which an embodiment according to the present invention may be implemented.

The computer system as shown in FIG. 6 includes a CPU (central processing unit) 601, a RAM (random access memory) 602, a ROM (read-only memory) 603, a system bus 604, an HD controller 605, a keyboard controller 606, a serial interface controller 607, a parallel interface controller 608, a display controller 609, a hard disk 610, a keyboard 611, a serial peripheral device 612, a parallel peripheral device 613 and a display 614. Among these components, connected with system bus 604 are CPU 601, RAM 602, ROM 603, HD controller 605, keyboard controller 606, serial interface controller 607, parallel interface controller 608 and display controller 609. Hard disk 610 is connected with HD controller 605, keyboard 611 is connected with keyboard controller 606, serial peripheral device 612 is connected with serial interface controller 607, parallel peripheral device 613 is connected with parallel interface controller 608, and display 614 is connected with display controller 609. It should be noted that the present invention is applied to both personal computers and handheld devices, such as Palm™ PC, PDAs (personal digital assistant) and mobile phones.

The present invention may be implemented in software, hardware or a combination of software and hardware. The hardware part may be implemented using a dedicated logic and the software part may be stored in a memory and executed by a proper instruction execution system, such as a microprocessor, a personal computer (PC) or a mainframe.

While the present invention has been described with reference to the embodiments presently considered, it is to be understood that the invention is not limited to the disclosed embodiments. The invention is intended to cover various modifications and equivalent arrangements falling within the spirit and scope of the appended claims. The scope of the claims is to be accorded with the broadest interpretation so as to encompass all such modifications and equivalent structures and functions.

What is claimed is:

1. A method for loading a class to a virtual machine, comprising:
    separating, using a separator module, each of a plurality of classes of a class archive into a skeleton, contents, and an index file having references to the contents associated with the skeleton of each class;
    organizing the class archive before class loading such that the organized class archive includes a class contraction portion and a rest portion, wherein the class contraction portion comprises a plurality of skeletons, one skeleton for each class, and the rest portion comprises a plurality of contents, one content for each corresponding skeleton;
    verifying a security of the class archive using a security verification module, wherein verification comprises loading and carrying out verification of a plurality of symbolic references except a verification of bytecodes on a loaded skeleton;
    loading only the class contraction portion of the class archive to the virtual machine using a load tracker;
        wherein the class contraction portion comprises only a basic class information portion of each of the plurality of classes in the class archive and the rest portion comprises a detailed class information portion of each of the plurality of classes that is not included in the class contraction portion, and
        wherein the basic class information consists of a magic code, a major version number, a minor version number, a count of constants, a constant pool and access flags and wherein the detailed class information comprises variables, methods and attributes and counts thereof;
    executing a program using the class archive at the virtual machine;
    loading, during runtime using a load tracker, a plurality of needed contents not loaded prior to executing the program;
    recording class usage information at runtime using a run recorder, wherein the class usage information comprises one or more of a miss rate of skeletons or contents, missed skeletons or contents and a non-usage rate of skeletons or contents, the missed skeletons or contents being recorded in a first-in first-out manner using a storage space with a fixed size; and
    optimizing the class archive by removing a plurality of unused skeletons during runtime from the class contraction portion of the class archive, and adding a plurality of contents loaded during runtime to the class contraction portion of the class archive.

2. The method according to claim 1, further comprising:
    reorganizing the class archive according to the class usage information such that the class archive includes the class contraction portion to be loaded.

3. The method according to claim 2, wherein:
    the skeletons or contents are added to the class contraction portion when the miss rate exceeds a predetermined threshold based on the index file of the class;
    the skeletons or contents left in the storage space at the end of running are added to the class contraction portion based on the index file of the class; and the skeletons or contents are removed from the class contraction portion when the non-usage rate exceeds another predetermined threshold based on the index file of the class.

4. The method according to claim 2, further comprising:
recording the loading sequence of the class at the moment of loading; and
sorting the class contraction portion in accordance with the loading sequence such that sorting of the class contraction portion is consistent with the loading sequence.

5. The method according to claim 1, further comprising:
carrying out internal verification during class loading; and
carrying out verification of symbolic references during execution of bytecodes.

6. An apparatus for loading a class into a memory of a virtual machine, comprising:
a class loader having a load tracker configured to record a loading sequence of the class;
a class archive comprising a plurality of classes and each of the plurality of classes having a class contraction portion, a rest portion;
wherein the class archive is organized before class loading such that the organized class archive includes the class contraction portion of the class archive;
wherein the class loader is configured to load only the class contraction portion of the class archive to the virtual machine;
a separator module configured to separate each of the plurality of classes of the class archive into a skeleton, contents, and an index file, wherein the class contraction portion comprises a plurality of skeletons, one skeleton for each class, the rest portion comprises a plurality of contents, one content for each corresponding skeleton, and the index file comprises references to the rest portion associated with the skeleton portion of each class;
a security verification module configured to verify a security of the class archive, wherein verification comprises loading and carrying out verification of a plurality of symbolic references except a verification of bytecodes on a loaded skeleton;
wherein the class contraction portion comprises only a basic class information portion of each of the plurality of classes in the class archive and the rest portion comprises a detailed class information portion of each of the plurality of classes that is not included in the class contraction portion, wherein the basic class information consists of a magic code, a major version number, a minor version number, a count of constants, a constant pool and access flags and wherein the detailed class information comprises variables, methods and attributes and counts thereof; and
a run recorder configured to record class usage information at runtime, wherein the class usage information comprises one or more of a miss rate of skeletons or contents, missed skeletons or contents and a non-usage rate of skeletons or contents, the missed skeletons or contents being recorded in a first-in first-out manner using a storage space with a fixed size; and
a processor configured to optimize the class archive by removing a plurality of unused skeletons during runtime from the class contraction portion of the class archive, and adding a plurality of contents loaded during runtime to the class contraction portion of the class archive.

7. The apparatus according to claim 6, further comprising:
a reorganizer configured to reorganize the class archive according to the class usage information such that the class archive includes the class contraction portion.

8. The apparatus according to claim 7, wherein:
the reorganizer is configured to reorganize the class archive by:
adding the skeletons or contents to the class contraction portion when the miss rate exceeds a predetermined threshold based on the index file of the class;
adding skeletons or contents left in the storage space at the end of running to the class contraction portion based on the index file of the class; or
removing the skeletons or contents from the class contraction portion when the non-usage rate exceeds another predetermined threshold based on the index file of the class.

9. The apparatus according to claim 8, wherein the reorganizer is further configured to sort the class contraction portion in accordance with the loading sequence such that the sorting of the class contraction portion is consistent with the loading sequence.

10. The apparatus according to claim 6, further comprising:
a security verifier configured to carry out (i) internal verification during class loading and (ii) verification of symbolic references during execution of bytecodes.

11. A method for reorganizing a class archive comprising a plurality of classes, comprising:
separating, using a separator module, each of the plurality of classes of the class archive into a skeleton, contents, and an index file having references to the contents associated with the skeleton of each class;
organizing the class archive before class loading such that the organized class archive includes a class contraction portion and a rest portion, wherein the class contraction portion comprises a plurality of skeletons, one skeleton for each class and the rest portion comprises a plurality of contents, one content for each corresponding skeleton;
verifying a security of the class archive using a security verification module, wherein verification comprises loading and carrying out verification of a plurality of symbolic references except a verification of bytecodes on a loaded skeleton;
loading only the class contraction portion of the class archive to a virtual machine using a load tracker;
wherein the class contraction portion comprises only a basic class information portion of each of the plurality of classes in the class archive and the rest portion comprises a detailed class information portion of each of the plurality of classes that is not included in the class contraction portion, wherein the basic class information consists of a magic code, a major version number, a minor version number, a count of constants, a constant pool and access flags and wherein the detailed class information comprises variables, methods and attributes and counts thereof;
executing a program using the class archive at the virtual machine;
loading, during runtime using the load tracker, a plurality of needed contents not loaded prior to executing the program;

recording class usage information at runtime using a run recorder, wherein the class usage information comprises one or more of a miss rate of skeletons or contents, missed skeletons or contents and a non-usage rate of skeletons or contents, the missed skeletons or contents being recorded in a first-in first-out manner using a storage space with a fixed size; and optimizing the class archive by removing a plurality of unused skeletons during runtime from the class contraction portion of the class archive, and adding a plurality of contents loaded during runtime to the class contraction portion of the class archive.

12. The method according to claim 11, further comprising:

separating each of the plurality of classes into a skeleton describing basic class information and contents describing detailed class information, and causing the class contraction portion to only include the skeleton of the class.

13. The method according to claim 11, wherein the organizing is carried out according to class usage information at runtime to cause the class contraction portion to only include a skeleton of a class to be used describing basic class information and contents to be used of the class describing detailed class information.

14. The method according to claim 11, wherein an original reorganizing of the class archive is carried out on the class archive to transform original class information in the class archive into a plurality of different class files.

15. The method according to claim 14, wherein contents describing detailed class information are separated into one or more class archives in accordance with the granularity required for loading.

* * * * *